United States Patent [19]
Cook et al.

[11] Patent Number: 6,043,914
[45] Date of Patent: Mar. 28, 2000

[54] DENSE WDM IN THE 1310 NM BAND

[75] Inventors: Joseph C. Cook, Garland; Xiaoping Charles Mao, Plano, both of Tex.

[73] Assignee: MCI Communications Corporation, Washington, D.C.

[21] Appl. No.: 09/106,725

[22] Filed: Jun. 29, 1998

[51] Int. Cl.[7] ...................................................... H04J 14/02
[52] U.S. Cl. ............................................ 359/124; 359/161
[58] Field of Search ..................................... 359/124, 161, 359/173, 188, 195; 385/122

[56] References Cited

U.S. PATENT DOCUMENTS

| | | | |
|---|---|---|---|
| 5,343,322 | 8/1994 | Pirio et al. | 359/161 |
| 5,696,614 | 12/1997 | Ishikawa et al. | 359/124 |

OTHER PUBLICATIONS

"Corning SMF–28™ CPC6 Single–Mode Optical Fiber", from http://www.iex.net/corning-fiber/products/pi1036.html, Oct. 1994.

Agrawal, Govind P., *Fiber–Optic Communication Systems*, John Wiley & Sons, Inc., 1997, pp. 425–466 and 535–536.

*Primary Examiner*—Kinfe-Michael Negash

[57] ABSTRACT

Dense wavelength division multiplexing within a 1310 nm band is accomplished over a single mode fiber. Carrier wavelengths are selected from within two windows, a low subband and/or a high subband, on either side of a guardband. The guardband includes the zero dispersion wavelength $\lambda_0$ of a single-mode fiber in the optical communication link and separates low subband and high subband within the 1310 nm band. Dispersion compensation is provided for carrier signals in each dense WDM channel in the low and high subbands.

32 Claims, 13 Drawing Sheets

$\lambda_0 = 1312\text{nm} \pm 3\text{nm}$

Nominal Center Wavelengths

| Number | f (Thz) | λ (nm) | f (Thz) | λ (nm) | f (Thz) | λ (nm) | f (Thz) | λ (nm) | f (Thz) | λ (nm) |
|---|---|---|---|---|---|---|---|---|---|---|
| 1 | 231.5 | 1294.99 | 229.5 | 1306.28 | 227.5 | 1317.76 | 225.5 | 1329.45 | 223.5 | 1341.35 |
| 2 | 231.4 | 1295.55 | 229.4 | 1306.85 | 227.4 | 1318.34 | 225.4 | 1330.04 | 223.4 | 1341.95 |
| 3 | 231.3 | 1296.11 | 229.3 | 1307.42 | 227.3 | 1318.92 | 225.3 | 1330.63 | 223.3 | 1342.55 |
| 4 | 231.2 | 1296.68 | 229.2 | 1307.99 | 227.2 | 1319.5 | 225.2 | 1331.22 | 223.2 | 1343.15 |
| 5 | 231.1 | 1297.24 | 229.1 | 1308.56 | 227.1 | 1320.09 | 225.1 | 1331.81 | 223.1 | 1343.75 |
| 6 | 231 | 1297.8 | 229 | 1309.13 | 227 | 1320.67 | 225 | 1332.41 | 223 | 1344.36 |
| 7 | 230.9 | 1298.36 | 228.9 | 1309.7 | 226.9 | 1321.25 | 224.9 | 1333 | 222.9 | 1344.96 |
| 8 | 230.8 | 1298.92 | 228.8 | 1310.28 | 226.8 | 1321.83 | 224.8 | 1333.59 | 222.8 | 1345.56 |
| 9 | 230.7 | 1299.49 | 228.7 | 1310.85 | 226.7 | 1322.41 | 224.7 | 1334.18 | 222.7 | 1346.17 |
| 10 | 230.6 | 1300.05 | 228.6 | 1311.42 | 226.6 | 1323 | 224.6 | 1334.78 | 222.6 | 1346.77 |
| 11 | 230.5 | 1300.61 | 228.5 | 1312 | 226.5 | 1323.58 | 224.5 | 1335.37 | 222.5 | 1347.38 |
| 12 | 230.4 | 1301.18 | 228.4 | 1312.57 | 226.4 | 1324.17 | 224.4 | 1335.97 | 222.4 | 1347.98 |
| 13 | 230.3 | 1301.74 | 228.3 | 1313.15 | 226.3 | 1324.75 | 224.3 | 1336.56 | 222.3 | 1348.59 |
| 14 | 230.2 | 1302.31 | 228.2 | 1313.72 | 226.2 | 1325.34 | 224.2 | 1337.16 | 222.2 | 1349.2 |
| 15 | 230.1 | 1302.87 | 228.1 | 1314.3 | 226.1 | 1325.92 | 224.1 | 1337.76 | 222.1 | 1349.8 |
| 16 | 230 | 1303.44 | 228 | 1314.87 | 226 | 1326.51 | 224 | 1338.35 | 222 | 1350.41 |
| 17 | 229.9 | 1304.01 | 227.9 | 1315.45 | 225.9 | 1327.1 | 223.9 | 1338.95 | 221.9 | 1351.02 |
| 18 | 229.8 | 1304.57 | 227.8 | 1316.03 | 225.8 | 1327.69 | 223.8 | 1339.55 | 221.8 | 1351.63 |
| 19 | 229.7 | 1305.14 | 227.7 | 1316.61 | 225.7 | 1328.27 | 223.7 | 1340.15 | 221.7 | 1352.24 |
| 20 | 229.6 | 1305.71 | 227.6 | 1317.19 | 225.6 | 1328.86 | 223.6 | 1340.75 | 221.6 | 1352.85 |

| f (Thz) | λ (nm) |
|---|---|
| 221.5 | 1353.46 |
| 221.4 | 1354.07 |
| 221.3 | 1354.68 |
| 221.2 | 1355.3 |
| 221.1 | 1355.91 |
| 221 | 1356.52 |
| 220.9 | 1357.14 |
| 220.8 | 1357.75 |
| 220.7 | 1358.37 |
| 220.6 | 1358.98 |
| 220.5 | 1359.6 |
| 220.4 | 1360.21 |
| 220.3 | 1360.83 |
| 220.2 | 1361.45 |
| 220.1 | 1362.07 |
| 220 | 1362.69 |
| 219.9 | 1363.31 |
| 219.8 | 1363.93 |
| 219.7 | 1364.55 |
| 219.6 | 1365.17 |

Note: 100 GHz spacing

FIG. 2B

(SMF-28)
NDSF Dispersion

| Number | λ (nm) | D(ps/nm.km) | λ (nm) | D(ps/nm.km) | λ (nm) | D(ps/nm.km) | λ (nm) | D(ps/nm.km) |
|---|---|---|---|---|---|---|---|---|
| 1 | 1295 | -1.5950673 | 1315 | 0.27505695 | 1335 | 2.06194222 | 1355 | 3.77164091 |
| 2 | 1296 | -1.4994843 | 1316 | 0.36632559 | 1336 | 2.14921233 | 1356 | 3.855201 |
| 3 | 1297 | -1.404125 | 1317 | 0.45738703 | 1337 | 2.23629031 | 1357 | 3.93858272 |
| 4 | 1298 | -1.3089885 | 1318 | 0.54824208 | 1338 | 2.32317686 | 1358 | 4.02178671 |
| 5 | 1299 | -1.2140739 | 1319 | 0.6388915 | 1339 | 2.40987271 | 1359 | 4.10481363 |
| 6 | 1300 | -1.1193804 | 1320 | 0.72933608 | 1340 | 2.49637857 | 1360 | 4.18766413 |
| 7 | 1301 | -1.0249072 | 1321 | 0.8195766 | 1341 | 2.58269513 | 1361 | 4.27033885 |
| 8 | 1302 | -0.9306535 | 1322 | 0.90961381 | 1342 | 2.66882312 | 1362 | 4.35283845 |
| 9 | 1303 | -0.8366182 | 1323 | 0.9994485 | 1343 | 2.75476322 | 1363 | 4.43516357 |
| 10 | 1304 | -0.7428008 | 1324 | 1.08908142 | 1344 | 2.84051614 | 1364 | 4.51731484 |
| 11 | 1305 | -0.6492002 | 1325 | 1.17851334 | 1345 | 2.92608258 | 1365 | 4.59929289 |
| 12 | 1306 | -0.5558156 | 1326 | 1.26774501 | 1346 | 3.01146322 | 1366 | 4.68109837 |
| 13 | 1307 | -0.4626464 | 1327 | 1.35677719 | 1347 | 3.09665875 | 1367 | 4.76273191 |
| 14 | 1308 | -0.3696915 | 1328 | 1.44561062 | 1348 | 3.18166986 | 1368 | 4.84419413 |
| 15 | 1309 | -0.2769503 | 1329 | 1.53424606 | 1349 | 3.26649724 | 1369 | 4.92548565 |
| 16 | 1310 | -0.1844218 | 1330 | 1.62268425 | 1350 | 3.35114156 | 1370 | 5.00660711 |
| 17 | 1311 | -0.0921053 | 1331 | 1.71092593 | 1351 | 3.43560351 | 1371 | 5.08755911 |
| 18 | 1312 | 0 | 1332 | 1.79897183 | 1352 | 3.51988374 | 1372 | 5.16834228 |
| 19 | 1313 | 0.09189495 | 1333 | 1.88682269 | 1353 | 3.60398294 | 1373 | 5.24895724 |
| 20 | 1314 | 0.18358033 | 1334 | 1.97447925 | 1354 | 3.68790178 | 1374 | 5.32940458 |

Note: $D = S_o/4 \cdot (\lambda - \lambda_o^4/\lambda^3)$, $S_o = 0.092$ ps/nm².km, $\lambda_o = 1312$ nm

FIG. 3B

DS Fiber Dispersion

| Number | λ (nm) | D(ps/nm.km) | λ (nm) | D(ps/nm.km) | λ (nm) | D(ps/nm.km) | λ (nm) | D(ps/nm.km) |
|---|---|---|---|---|---|---|---|---|
| 1 | 1295 | -24.6533447 | 1315 | -22.138117 | 1335 | -19.750014 | 1355 | -17.479889 |
| 2 | 1296 | -24.524507 | 1316 | -22.01577 | 1336 | -19.633779 | 1356 | -17.369325 |
| 3 | 1297 | -24.395908 | 1317 | -21.893741 | 1337 | -19.517838 | 1357 | -17.259033 |
| 4 | 1298 | -24.267649 | 1318 | -21.772026 | 1338 | -19.40219 | 1358 | -17.149013 |
| 5 | 1299 | -24.13973 | 1319 | -21.650626 | 1339 | -19.286833 | 1359 | -17.039264 |
| 6 | 1300 | -24.012149 | 1320 | -21.529539 | 1340 | -19.171766 | 1360 | -16.929785 |
| 7 | 1301 | -23.884904 | 1321 | -21.408764 | 1341 | -19.056989 | 1361 | -16.820574 |
| 8 | 1302 | -23.757995 | 1322 | -21.2883 | 1342 | -18.942499 | 1362 | -16.71163 |
| 9 | 1303 | -23.63142 | 1323 | -21.168145 | 1343 | -18.828297 | 1363 | -16.602954 |
| 10 | 1304 | -23.505178 | 1324 | -21.048299 | 1344 | -18.714382 | 1364 | -16.494543 |
| 11 | 1305 | -23.379267 | 1325 | -20.92876 | 1345 | -18.600751 | 1365 | -16.386397 |
| 12 | 1306 | -23.253686 | 1326 | -20.809527 | 1346 | -18.487404 | 1366 | -16.278514 |
| 13 | 1307 | -23.128435 | 1327 | -20.690599 | 1347 | -18.37434 | 1367 | -16.170895 |
| 14 | 1308 | -23.003511 | 1328 | -20.571974 | 1348 | -18.261558 | 1368 | -16.063537 |
| 15 | 1309 | -22.878914 | 1329 | -20.453653 | 1349 | -18.149057 | 1369 | -15.956441 |
| 16 | 1310 | -22.754642 | 1330 | -20.335632 | 1350 | -18.036835 | 1370 | -15.849604 |
| 17 | 1311 | -22.630694 | 1331 | -20.217913 | 1351 | -17.924893 | 1371 | -15.743026 |
| 18 | 1312 | -22.507068 | 1332 | -20.100492 | 1352 | -17.813228 | 1372 | -15.636706 |
| 19 | 1313 | -22.383765 | 1333 | -19.983369 | 1353 | -17.701839 | 1373 | -15.530644 |
| 20 | 1314 | -22.260781 | 1334 | -19.866544 | 1354 | -17.590727 | 1374 | -15.424837 |

Note: $D = S_o/4 * (\lambda - \lambda_o^4/\lambda^3)$, $S_o = 0.072$ ps/nm².km, $\lambda_o = 1551$ nm

FIG. 3C

Truewave Fiber Dispersion

| Number | λ (nm) | D(ps/nm.km) | λ (nm) | D(ps/nm.km) | λ (nm) | D(ps/nm.km) | λ (nm) | D(ps/nm.km) |
|---|---|---|---|---|---|---|---|---|
| 1 | 1295 | -21.201058 | 1315 | -18.782222 | 1335 | -16.484033 | 1355 | -14.297719 |
| 2 | 1296 | -21.077106 | 1316 | -18.664524 | 1336 | -16.37213 | 1356 | -14.191193 |
| 3 | 1297 | -20.953479 | 1317 | -18.547125 | 1337 | -16.260505 | 1357 | -14.084925 |
| 4 | 1298 | -20.830174 | 1318 | -18.430026 | 1338 | -16.149158 | 1358 | -13.978916 |
| 5 | 1299 | -20.707191 | 1319 | -18.313225 | 1339 | -16.038087 | 1359 | -13.873162 |
| 6 | 1300 | -20.584528 | 1320 | -18.196721 | 1340 | -15.927292 | 1360 | -13.767665 |
| 7 | 1301 | -20.462185 | 1321 | -18.080512 | 1341 | -15.816771 | 1361 | -13.662422 |
| 8 | 1302 | -20.34016 | 1322 | -17.964599 | 1342 | -15.706523 | 1362 | -13.557434 |
| 9 | 1303 | -20.218451 | 1323 | -17.848978 | 1343 | -15.596548 | 1363 | -13.452698 |
| 10 | 1304 | -20.097058 | 1324 | -17.73365 | 1344 | -15.486843 | 1364 | -13.348214 |
| 11 | 1305 | -19.97598 | 1325 | -17.618614 | 1345 | -15.37741 | 1365 | -13.243981 |
| 12 | 1306 | -19.855214 | 1326 | -17.503868 | 1346 | -15.268245 | 1366 | -13.139998 |
| 13 | 1307 | -19.734761 | 1327 | -17.389411 | 1347 | -15.159349 | 1367 | -13.036265 |
| 14 | 1308 | -19.614618 | 1328 | -17.275242 | 1348 | -15.05072 | 1368 | -12.93278 |
| 15 | 1309 | -19.494785 | 1329 | -17.161359 | 1349 | -14.942357 | 1369 | -12.829542 |
| 16 | 1310 | -19.37526 | 1330 | -17.047763 | 1350 | -14.83426 | 1370 | -12.72655 |
| 17 | 1311 | -19.256043 | 1331 | -16.934452 | 1351 | -14.726427 | 1371 | -12.623805 |
| 18 | 1312 | -19.137132 | 1332 | -16.821424 | 1352 | -14.618857 | 1372 | -12.521304 |
| 19 | 1313 | -19.018525 | 1333 | -16.708679 | 1353 | -14.51155 | 1373 | -12.419047 |
| 20 | 1314 | -18.900223 | 1334 | -16.59216 | 1354 | -14.404504 | 1374 | -12.317032 |

Note: $D = S_o/4 * (\lambda - \lambda_o^4/\lambda^3)$, $S_o = 0.075$ ps/nm$^2$.km, $\lambda_o = 1515$ nm

FIG. 3D

LS Fiber Dispersion

| Number | λ (nm) | D(ps/nm.km) | λ (nm) | D(ps/nm.km) | λ (nm) | D(ps/nm.km) |
|---|---|---|---|---|---|---|
| 1 | 1295 | -27.840881 | 1315 | -25.123672 | 1355 | -20.093979 |
| 2 | 1296 | -27.701571 | 1316 | -24.991528 | 1356 | -19.974639 |
| 3 | 1297 | -27.562633 | 1317 | -24.859728 | 1357 | -19.855595 |
| 4 | 1298 | -27.424064 | 1318 | -24.728272 | 1358 | -19.736847 |
| 5 | 1299 | -27.285865 | 1319 | -24.597156 | 1359 | -19.618393 |
| 6 | 1300 | -27.148032 | 1320 | -24.466381 | 1360 | -19.500231 |
| 7 | 1301 | -27.010565 | 1321 | -24.335945 | 1361 | -19.382362 |
| 8 | 1302 | -26.873463 | 1322 | -24.205846 | 1362 | -19.264783 |
| 9 | 1303 | -26.736724 | 1323 | -24.076084 | 1363 | -19.147495 |
| 10 | 1304 | -26.600347 | 1324 | -23.946657 | 1364 | -19.030495 |
| 11 | 1305 | -26.464329 | 1325 | -23.817564 | 1365 | -18.913782 |
| 12 | 1306 | -26.328671 | 1326 | -23.688804 | 1366 | -18.797357 |
| 13 | 1307 | -26.19337 | 1327 | -23.560375 | 1367 | -18.681217 |
| 14 | 1308 | -26.058426 | 1328 | -23.432276 | 1368 | -18.565361 |
| 15 | 1309 | -25.923836 | 1329 | -23.304506 | 1369 | -18.449789 |
| 16 | 1310 | -25.789599 | 1330 | -23.177063 | 1370 | -18.3345 |
| 17 | 1311 | -25.655715 | 1331 | -23.049947 | 1371 | -18.219492 |
| 18 | 1312 | -25.522182 | 1332 | -22.923156 | 1372 | -18.104764 |
| 19 | 1313 | -25.388997 | 1333 | -22.796689 | 1373 | -17.990316 |
| 20 | 1314 | -25.256161 | 1334 | -22.670545 | 1374 | -17.876146 |

Note: $D = S_o/4 * (\lambda - \lambda_o^4/\lambda^3)$, $S_o = 0.075$ ps/nm$^2$.km, $\lambda_o = 1567.5$ nm

FIG. 3E

DENSE WDM IN THE 1310 NM BAND

CROSS-REFERENCE TO OTHER APPLICATIONS

The following two commonly-owned, co-pending U.S. patent applications are each incorporated by reference herein as if reproduced in full below:

1. "Method and Apparatus for Modular Multiplexing and Amplification in a Multi-Channel Plan," Appl. Ser. No. 08/923,461, filed Sep. 4, 1997; and 2. "Hybrid Bi-Directional Three Color Wave Division Multiplexer," Appl. Ser. No. 08/762,035, filed Dec. 9, 1996, a continuation of Appl. Ser. No. 08/671,183, filed Sep. 26, 1996.

BACKGROUND OF THE INVENTION

1. Field of the Invention

The present invention relates to fiber optic networks and multi-channel communication systems.

2. Related Art

Modern communication systems increasingly rely upon fiber optic networks to carry increasing amounts of data between sites. The use of multiple optical carriers, also called channels, over the same optical fiber increases capacity. Wavelength division multiplexing (WDM) allows multiple channels to be carried on a fiber in different carrier wavelengths. Attenuation and dispersion in an optical fiber limit the distance an optical signal can travel without amplification and/or dispersion compensation.

In commercial optical fibers, there are two infrared wavelength windows or bands at which the fiber material offers minimal attenuation. One window is generally called the "1310 nm window" and includes a wavelength band between approximately 1150–1385 nm (nanometer) with a minimum loss of about 0.4 dB/km. The other window includes longer wavelengths in a range between approximately 1500–1600 nm and has minimum attenuation of about 0.2 dB/km (decibel/kilometer). The window between about 1520 to 1560 nm is often amplified by erbium-doped materials and thus has been called the "erbium band" or "erbium window."

Because of the lower loss and corresponding reduction in line amplification required, the telecommunication industry has focused upon devices and fibers to support operation at around 1550 nm, especially in multi-channel, WDM applications. The 1310 nm band was essentially abandoned as new fibers, semiconductor lasers and receivers were developed to support 1550 nm WDM operation. Heretofore, commercial systems have primarily employed the 1310 nm window for single-channel communication.

In order to increase the utilization of an optical communications fiber, wavelength division multiplexing (WDM) is employed to send multiple optical carriers along the fiber, each at a different wavelength. Engineers are striving to maximize the capacity of the erbium band in a communications network by putting as many wavelengths as possible onto a fiber. While two-wavelength and four-wavelength systems are fairly common, the telecommunications industry is planning for ways to crowd eight or sixteen channels at 100 GHz or 50 GHz spacing within the narrow erbium band. This presents significant challenges in transmitter stability, receiver selectivity, ease of line amplification and equalization, and avoidance of non-linear interference effects such as four-wave mixing (FWM). Thus, only a small number of WDM channels can be effectively supported in the erbium band of an optical fiber network without sacrificing reliable, high-quality communication. For example, according to one International Telecommunication Union (ITU) standard, a 100 Gigahertz (GHz) spacing is provided between channels to maintain signal separation and quality. This 100 GHz spacing translates to a wavelength range of approximately 0.8 nm, meaning only 40 WDM channels fit within an erbium fiber band. However, if each optical carrier is modulated at high data bit rates, such as 10 Giga-bits/second (Gb/s), a 200 GHz spacing is preferably used between channels to avoid crosstalk. As a result, only sixteen channels with 200 GHz spacing can be used effectively in an operating window within an erbium band of approximately 1530 to 1561 nm.

Group velocity dispersion also complicates WDM deployment in an erbium band because a given fiber exhibits a sloped dispersion characteristic as a function of wavelength. Thus, a fiber can exhibit small dispersion values only over a subset of the wavelengths available in the erbium band. For carrier wavelengths distant from the zero-dispersion wavelength ($\lambda_0$), the dispersion effect must be compensated at intervals along the fiber to assure reliable signal reception. This further limits the number of channels which can be used in the erbium band for reliable, high-quality communication One of the earliest types of single-mode fiber that came into widespread use was retrospectively dubbed Non-Dispersion Shifted Fiber (NDSF). For example, such fiber has a zero-dispersion wavelength $\lambda_0$ around 1312 nm and a zero dispersion slope $S_0$ of about 0.090 ps/nm$^2$-km. See, e.g, CORNING® SMF-28™ CPC6 single-mode optical fiber, *Product Information*, 1997, pages 1 and 3. Further, the NDSF fiber can have a positive average dispersion across the erbium band. In practice, designers have been able to compensate for this by installing negative-slope fiber at intervals along an optical link.

A more recent fiber, the Dispersion-Shifted Fiber (DSF), was formulated such that the $\lambda_0$ falls at 1550 nm, making it ideal for transmitting at that wavelength. However, one drawback is that if several WDM carriers are crowded around this wavelength and then launched with sufficient optical power density into a common fiber, then the carriers will interact through Four-Wave Mixing (FWM) due to non-linearity of the fiber material.

The capacity of fibers and fiber networks needs to be increased. Multiple channels need to be added without sacrificing the reliability and quality of voice and data communication. The overall bandwidth of a single-mode fiber, such as, an NDSF fiber and/or a DSF fiber, needs to be optimized. A dense WDM window is needed in which many channels can be used to support multi-channel communication over single-mode fiber.

SUMMARY OF THE INVENTION

The present invention provides a method and system for dense wavelength division multiplexing (WDM) that supports multi-channel communication in the 1310 nm band over a fiber link. In one example, the dense WDM supports multi-channel communication in the 1310 nm band over a single-mode fiber. Thus, according to the invention, more channels can be added within the relatively broad 1310 nm window than the erbium window, to increase the capacity of single-mode optical fibers within an optical fiber network. This avoids more expensive options for increasing capacity of a fiber optic network, such as, laying additional fiber in a network or adding channels in the crowded erbium band.

The present invention provides a multi-channel optical communication link wherein a single-mode fiber link carries dense WDM optical signals within the 1310 nm band instead of, or in addition to, the erbium band. In particular, carrier wavelengths are selected within either of two windows (a low subband and a high subband) on either side of a guardband. The guardband includes a zero dispersion wavelength $\lambda_0$, which is about 1312 ±3 nm for many installed and new single mode fibers in a fiber optic network.

The width of the guardband can be set to minimize four-wave mixing (FWM). In one embodiment of the present invention, a guardband centered upon the $\lambda_0$ has a width such that the absolute value of dispersion values in both the high and low subbands is approximately equal to or greater than 0.5 ps/nm-km. In another embodiment, a guardband of about 17 nm centered upon the $\lambda_0$ is used to separate the high and low subbands. In each of these embodiments, the width of the guardband avoids four-wave mixing FWM by assuring that closely spaced carriers co-propagate in a dispersive environment, thereby "washing out" the phase coherence required for effective mixing over a length of fiber. Therefore, a dense concentration of modulated carriers may occupy the low subband and/or high subband without causing any significant interference. The presence of the guardband is especially important in reducing FWM over non-dispersion shifted fiber where the magnitude of dispersion is not as great as in dispersion-shifted fiber.

By straddling the zero dispersion wavelength $\lambda_0$, the two subbands or windows can also experience different dispersion values. For NDSF, the low subband or shorter wavelength window experiences negative dispersion and the high subband or longer wavelength window experiences positive dispersion. Positive dispersion in the high subband may be readily compensated using conventional DSF, or the recently introduced LS fiber, because these are optimized for 1550 nm and have a substantial negative dispersion in the 1310 nm band. Positive dispersion in the high subband can also be corrected or ameliorated by a chirped fiber Bragg grating set to impart a negative dispersion, as is well known in the art Likewise, the negative dispersion in the low subband or shorter wavelength window can be compensated by a chirped fiber Bragg grating set to impart a positive dispersion.

For DSF, both the low subband and the high subband experience negative dispersion. Accordingly, such negative dispersion in the low and high subbands can be compensated by a chirped fiber Bragg grating set to impart a positive dispersion. Single-mode fiber (NDSF and DSF) also introduces a positive slope dispersion across the 1310 nm window in both the-low and high subbands. Such a positive dispersion slope can be corrected or ameliorated by a chirped fiber:Bragg grating, as is well known in the art.

The 1310 nm band is relatively wide, bracketed on the long end by the absorption peaks of silica and water. There is also a minimum wavelength limit imposed by the geometry of the fiber to guarantee single-mode propagation. In one example, the present invention provides low and high subbands spanning approximately 1270–1300 nm and 1320–1365 nm, allowing for considerably more channels than are expected with the popular, but narrow erbium band.

In one embodiment of the present invention, a multi-channel optical communication system and method is provided. The multi-channel communication system and method involves a plurality of carrier signals transported through a single mode fiber. The single mode fiber has a zero dispersion wavelength $\lambda_0$. The carrier signals have wavelengths in at least one of a low subband and a high subband within a 1310 nm band. The low subband and high subband are separated by a guardband that includes the zero dispersion wavelength $\lambda_0$ of the single mode fiber. In one preferred example, the zero dispersion wavelength $\lambda_0$ is in a range between approximately 1309 nm to 1315 nm. According to a further feature, the guardband has a width of at least two nm, and preferably, a width of approximately 17 nm.

In one preferred example, the guardband has a range between approximately 1300 nm and 1320 nm. The low subband has a range between approximately 1270 nm and 1300 nm, and the high subband has a range between approximately 1320 and 1365 nm. The plurality of carrier signals transport data in respective dense WDM channels within the low subband and the high subband. The dense WDM channels are separated by a channel spacing of at least approximately 100 GHz.

In another preferred example, the guardband has a range between approximately 1300 nm and 1320 , the low subband has a range between approximately 1295 nm and 1300 nm, and the high subband-has a range between approximately 1320 and 1365 nm. Carrier signals are transported in any one of approximately nine dense WDM channels within the low subband and approximately seventy-six dense WDM channels within the high subband. Each of these dense WDM channels within the low and high subbands is separated by a channel spacing of at least approximately 100 Ghz.

According to a further feature of the present invention, a method and system for dense WDM dispersion compensation is provided. In one example, a dense WDM DCM unit compensates for negative dispersion and/or positive dispersion in the plurality of carrier signals transported over a single mode fiber in the respective dense WDM channels. When the single mode fiber is NDSF, the dense WDM dispersion compensation unit has a positive dispersion compensation unit (DCM) and a negative dispersion compensation unit (DCM).

The positive DCM compensates for positive dispersion in each carrier signal transported over NDSF in the respective dense WDM channels in the high subband. For example, the positive DCM can be a dispersion shifted fiber segment and/or a chirped fiber Bragg grating designed to impart a negative dispersion value having sufficient magnitude to correct or ameliorate the magnitude of the positive dispersion of NDSF. In this way, the dispersion shifted fiber segment and/or the chirped fiber Bragg grating compensate for the magnitude of positive dispersion in each carrier signal transported over NDSF in the respective dense WDM channels in the high subband.

The negative DCM compensates for negative dispersion in each carrier signal transported over NDSF in the respective dense WDM channels in the low subband. For example, negative DCM can be a chirped fiber Bragg grating to compensate for the magnitude of negative dispersion in each carrier signal transported over NDSF in respective dense WDM channels in the low subband.

Similarly, for DSF, the dense WDM DCM need only be a negative DCM which compensates for negative dispersion in each carrier signal in the respective dense WDM channels in the low subband and high subbands. For example, such a negative DCM can be a chirped fiber Bragg grating that imparts a positive dispersion value which compensates for the magnitude of negative dispersion in each carrier signal transported over DSF in respective dense WDM channels in the low and high subbands.

In addition, a dense WDM DCM according to the present invention can also compensate for the positive-slope dispersion imparted by single mode fiber. For example, a chirped fiber Bragg grating can be used to finely compensate for the slope of positive dispersion in each carrier signal transported over a single mode fiber NDSF or DSF) in respective dense WDM channels in the low and high subbands.

In one embodiment, a wavelength division multiplexing unit is optically coupled to a single mode fiber. The WDM unit multiplexes individual carrier signals and outputs the plurality of carrier signals to the single mode fiber. For example, the wavelength division multiplexing unit can comprise at least one narrow band WDM unit and can multiplex and/or demultiplex carrier signals traveling in one or two directions (that is, unidirectional or bidirectional traffic).

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

FIG. 2B is a table showing an example of 100 channels at 100 GHz spacing including 85 channels in high and low subbands and 15 channels in a guardband, a shown in FIG. 2A.

FIG. 3B is a diagram that shows dispersion for an NDSF single-mode fiber in 80 channels of a 1310 nm window.

FIG. 3C is a diagram that shows dispersion for a DSF single-mode fiber in 80 channels of a 1310 nm window.

FIG. 3D is a diagram that shows dispersion for a DSF TRUEWAVE™ single-mode fiber in 80 channels of a 1310 nm window.

FIG. 3E is a diagram that shows dispersion for a DSF linearly-sloped (LS) single-mode fiber in 80 channels of a 1310 nm window.

Figure 1:
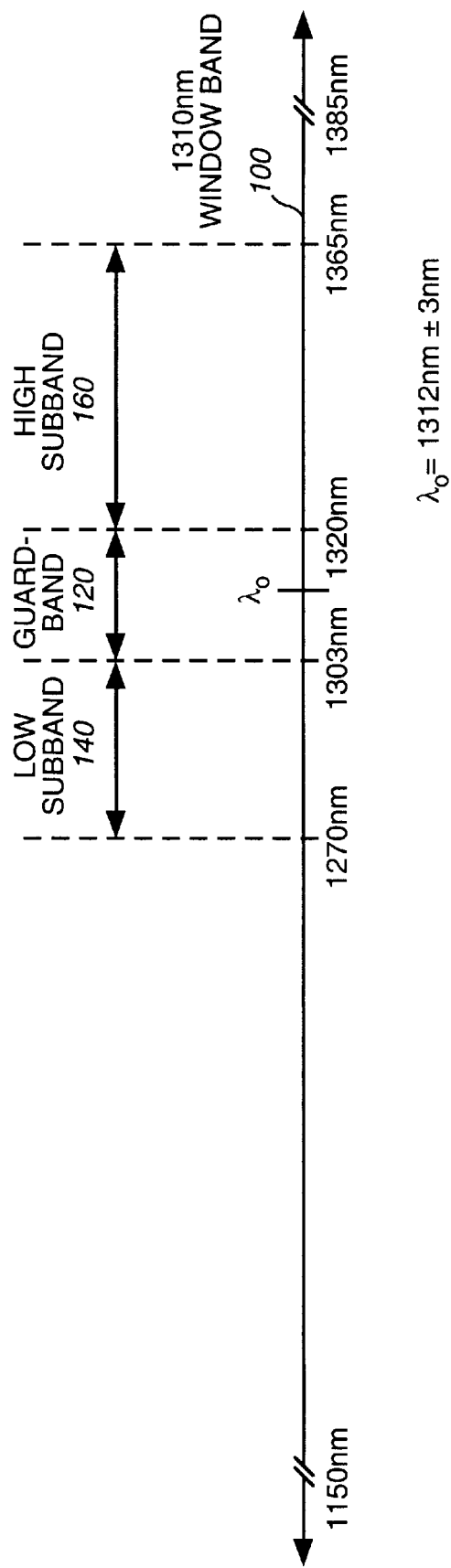
FIG. 1 is a diagram showing dense wavelength division multiplexing (WDM) in the 1310 nm window according to one embodiment of the present invention.

The present invention will now be described with reference to the accompanying drawings. In the drawings, like reference numbers typically indicate identical or functionally similar elements. Additionally, the left-most digit(s) of a reference number typically identifies the drawing in which the reference number first appears.

DETAILED DESCRIPTION OF THE PREFERRED EMBODIMENTS

Terminology

The term "1310 nm band" refers to a band of wavelengths within an range of approximately 1150 nanometer (nm) and 1385 nm.

Dense WDM within a 1310 nm Window

FIG. 1 is a diagram showing dense wavelength division multiplexing (WDM) in the 1310 nm window 100 according to one embodiment of the present invention. According to the present invention, an optical communication link (not shown in FIG. 1) carries dense WDM optical signals within 1310 nm window 100 instead of; or in addition to, the erbium band. The optical communication link has at least one single-mode fiber, including, but not limited to, non-dispersion shifted fiber (NDSF) and dispersion shifted fiber (DSF). DSF can include linearly-sloped dispersion shifted fiber (LSF). Example fiber links supporting a dense DWM according to the present invention are described in further detail with respect to FIGS. 4–5.

As shown in FIG. 1, carrier wavelengths are selected from within two windows, low subband 140 and high subband 160, on either side of a guardband 120. Guardband 120 includes the zero dispersion wavelength $\lambda_0$ of a single-mode fiber in the optical communication link and separates low subband 140 and high subband 160.

In the embodiment shown in FIG. 1, zero dispersion wavelength $\lambda_0$ is 1312 nm ±3 nm as found in many installed or new single mode fibers in a fiber optic network. Guardband 120 is approximately 17 nm wide and centered upon $\lambda_0$. In particular, guardband 120 covers a range of wavelengths between approximately 1303 nm and 1320 nm to separate low subband 140 and high subband 160. Low subband 140 covers a wavelength range between approximately 1270 nm and 1303 nm. High subband 160 covers a range between approximately 1320 nm and 1365 nm.

According to the invention, then, one or more channels (also called carrier wavelengths) having equal or non-equal spacing can be provided in low subband 140 and/or high subband 160. Channels are not provided in guardband 120. Further, the width of guardband 120 can be set to minimize four-wave mixing (FWM). In one embodiment of the present invention, a guardband centered upon the $\lambda_0$ has a width such that the absolute value of dispersion values in both the high and low subbands is approximately equal to or greater than 0.5 ps/nm-km. In another embodiment, a guardband of about 17 nm centered upon the $\lambda_0$ is used to separate the high and low subbands. This avoids four-wave mixing by assuring that closely spaced carriers co-propagate in a dispersive environment, thereby "washing out" the phase coherence required for effective mixing over a length of fiber. Therefore, a dense concentration of modulated carriers may occupy each subband 140, 160 without causing any significant interference.

The wavelength values shown in FIG. 1 are illustrative and can be varied. The 1310 nm band is relatively wide, bracketed on the long end by the absorption peak of water (approximately 1385 nm). There is also a minimum wavelength limit (approximately 1150 nm to 1270 nm) imposed by the geometry of the fiber to guarantee single-mode propagation. Guardband 120 and subbands 140 and 160 can also vary in size depending upon a particular application as would be apparent to one skilled in the art given this description.

This dense WDM multi-channel plan according to the present invention allows for considerably more channels than are expected with the popular, but narrower, erbium band. Optical transducers and amplifiers for operation in the 1310 nm band are also relatively inexpensive.

Figure 2A:
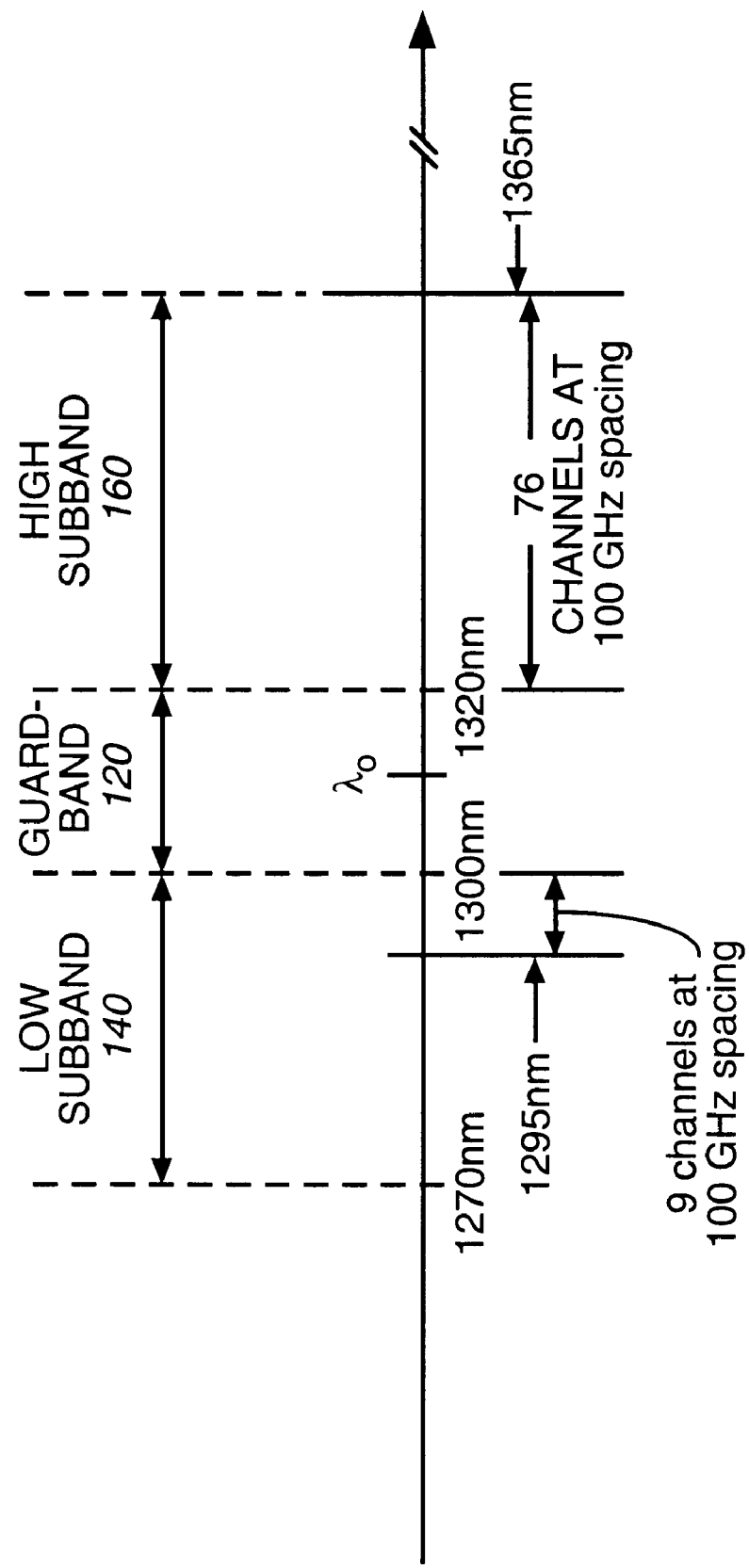
FIG. 2A is a diagram showing an example of 85 channels at 100 GHz spacing in the dense WDM 1310 nm window of FIG. 1.

As shown in FIGS. 2A and 2B, even a relatively conservative dense WDM design following the present invention allows many more channels to be used than an erbium band WDM design. FIG. 2A is a diagram showing an example of 85 channels at 100 GHz spacing in the dense WDM 1310 nm window of FIG. 1. FIG. 2B is a table showing an example of 100 channels at 100 GHz spacing including the 85 channels in high and low subbands and 15 channels (not used) in a guardband shown in FIG. 2A. Each channel is listed with a nominal frequency (f) in Terahertz (THz) and center wavelength $\lambda$ (nm).

In the example of FIG. 2A, low subband 140 includes 9 channels at 100 GHz spacing between approximately 1295 nm and 1300 nm High subband 160 includes 76 channels at 100 GHz spacing between approximately 1320 nm and 1365 nm. However, more channels can certainly be added in low subband 140 or high subband 160. For instance, channels at wavelengths below 1295 nm can be added. Channels at wavelengths above 1365 nm or within guardband 120 can be used as well depending upon a particular design application and tolerance. Channel spacing can also be smaller than 100 GHz to add even more channels, especially for low bit rates. Channel spacing greater than 100 GHz (or even greater than 200 GHz) can be provided to further ensure signal separation.

In contrast, in the erbium band, a 100 GHz spacing requirement translates to a wavelength range of approximately 0.8 nm. This means only 40 WDM channels fit within the erbium fiber band. If each optical carrier is modulated at high data bit rates, such as 10 Giga-bits/second (Gb/s), a 200 GHz spacing is used between channels to avoid crosstalk As a result, only sixteen channels with 200 GHz spacing can be used effectively in an operating window within an erbium band of approximately 1530 to 1561 nm. Thus, even the conservative dense WDM design of FIGS. 2A and 2B supports over 220% more channels at 100 GHz spacing than multi-channel WDM in the erbium-band.

Single-Mode Fiber Dispersion

By straddling zero dispersion wavelength $\lambda_0$, carriers in subbands 140 and 160 also experience different dispersion values. As shown in FIGS. 3A–3E, carriers in low subband 140 and high subband 160 within a 1310 nm. window experience either positive or negative dispersion along a single-mode fiber depending the fiber type. Single-mode fiber (NDSF and DSF) also introduces a positive slope dispersion across the 1310 nm window.

Figure 3A:
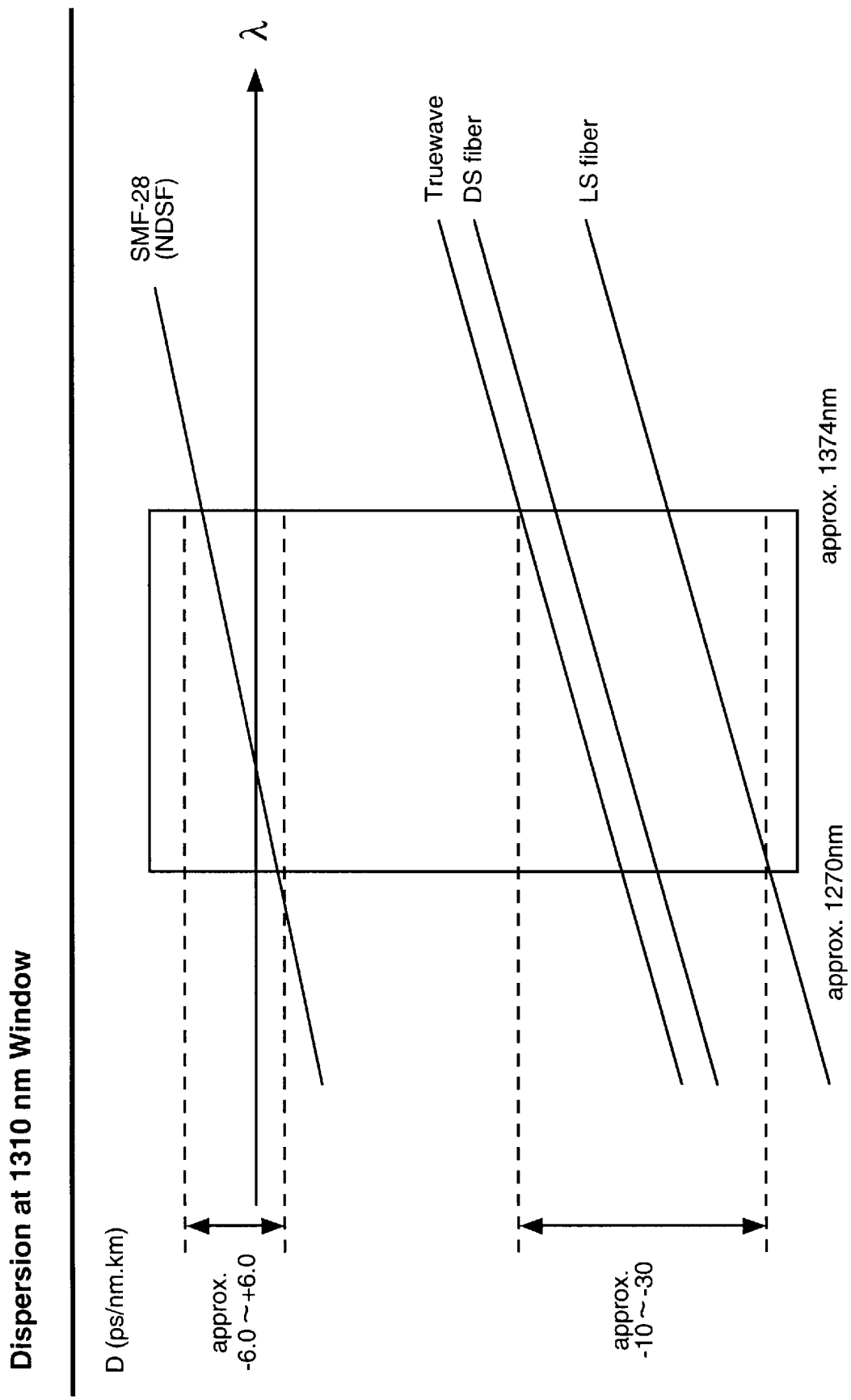
FIG. 3A is a diagram that shows dispersion for NDSF and DSF single-mode fibers in a 1310 nm window.

FIG. 3A is a diagram that shows dispersion for NDSF and DSF single-mode fibers in a 1310 nm window. The NDSF fiber is a CORNING® ID SMF-28 fiber having a dispersion value between approximately –6.0 and 6.0 within a 1310 nm window (approx. 1270 nm to 1374 nm). FIG. 3B is a diagram that shows a dispersion range between approx. –1.595 to 5.329 for an NDSF single-mode fiber (SMF-28) in 80 channels of a 1310 nm window between approx. 1295 nm. and 1374 nm. Thus, carriers in low subband 140 experience negative dispersion along a NDSF. Carriers in high subband 160 experience positive dispersion along a NDSF such as SMF-28.

However, as shown in FIGS. 3A and 3C–3E, DSF single-mode fiber, including TRUEWAVE™ and linearly-sloped (LS) fiber, has a negative dispersion value between approximately –10 and –30 within a 1310 nm window (approx. 1270 nm to 1374 nm). Carriers in low subband 140 and high subband 160 then experience negative dispersion (at different negative dispersion values) along DSF. FIG. 3C is a diagram that shows dispersion for a DSF single-mode fiber in 80 channels of a 1310 nm window. For the DSF fiber, the dispersion value is between approximately –24.653 and –15.425 within a 1310 nm window (approx. 1295 nm to 1374 nm).

FIG. 3D is a diagram that shows dispersion for a DSF TRUEWAVE™ single-mode fiber in 80 channels of a 1310 nm window. For the TRUEWAVE™ fiber, the dispersion value is between approximately –21.201 and –12.317 within a 1310 nm window (approx. 1295 nm to 1374 nm).

FIG. 3E is a diagram that shows dispersion for a DSF linearly-sloped (LS) single-mode fiber in 80 channels of a 1310 nm window. For the LS fiber, the dispersion value is between approximately –27.841 and –17.876 within a 1310 nm window (approx. 1295 nm to 1374 nm).

Carriers in low subband 140 experience negative dispersion along NDSF. Carriers in high subband 160 experience positive dispersion along NDSF. The latter (positive dispersion) may be readily compensated using one or more segments of conventional DSF, or the recently introduced LS fiber, because these are optimized for 1550 nm and have a substantial negative dispersion at 1310 nm. Positive dispersion across high subband 160 can also be corrected or ameliorated by one or more chirped fiber Bragg gratings, as is well known in the art. Likewise, the negative dispersion in low subband 140 (and/or in high subband 160) can be compensated by one or more chirped fiber Bragg gratings. Such dispersion compensation is described in farther detail below with respect to FIG. 6.

The operation of dense WDM in the 1310 nm band according to present invention will now be described with respect to example fiber link segments in FIGS. 4 and 5. An example dense WDM dispersion compensation module (DCM) is also described with respect to FIG. 6.

Fiber Link Supporting Dense WDM in 1310 nm Window

Figure 4:
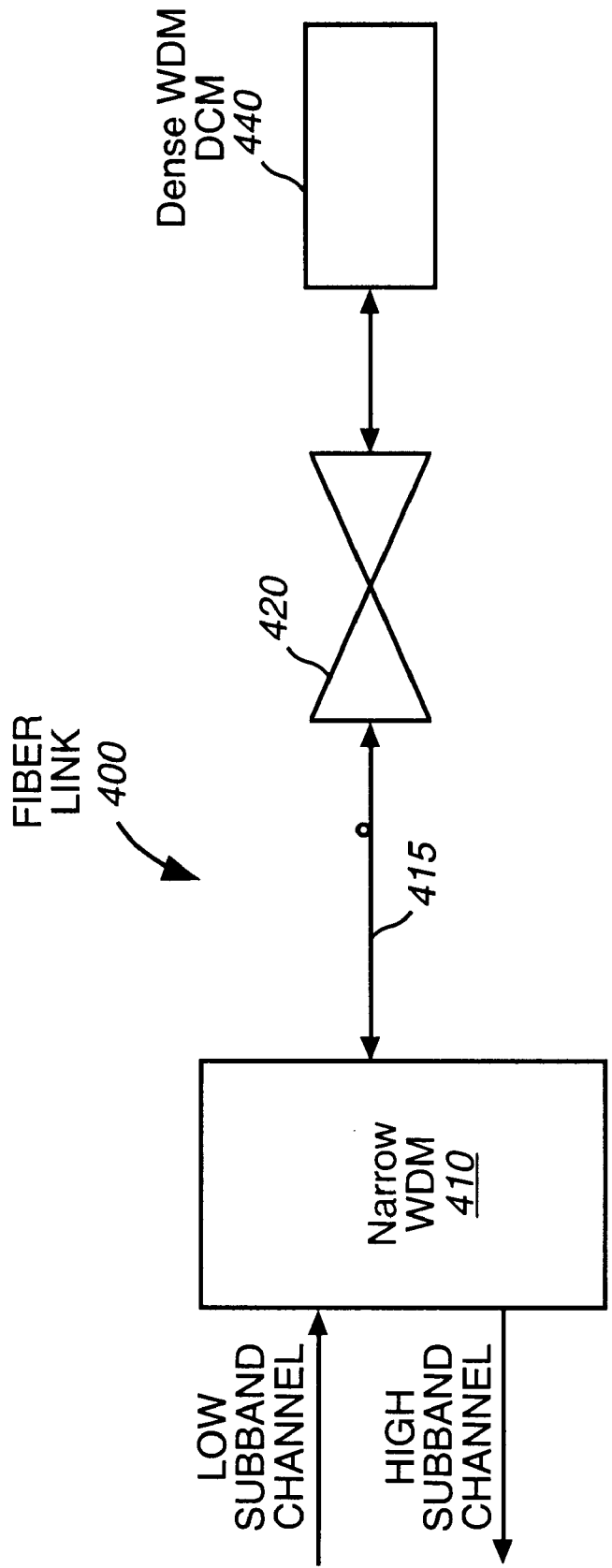
FIG. 4 is a diagram of an example fiber link segment supporting WDM in the 1310 nm window according to the present invention.

FIG. 4 is a diagram of an example fiber link segment 400 supporting WDM in the 1310 nm window according to the present invention. Fiber link 400 includes a narrow wavelength division multiplexer (WDM) 410, a single mode fiber 415, a bi-directional optical amplifier 420, and a dense WDM dispersion compensation module (DCM) 440. WDM 410 can be any type of wavelength division multiplexer and/or demultiplexer or combinations of wavelength division multiplexer/demultiplexers. Single mode fiber 415 can be any type of single mode fiber including, but not limited to, NDSF (CORNING® SMF-28) and DSF fibers (DS, TRUEWAVE™ and LS). Bi-directional optical amplifier 420 can be any type of bi-directional optical amplifier for amplifing 1310 nm band wavelengths. Dense WDM DCM 440 is described further with respect to FIG. 6. Other optical components such as couplers, splitters, etc. can be used is well-known in WDM communications. Optical emitters and receivers (not shown) are also provided to generate and detect the carrier signals in the respective dense WDM channels, that is, the low subband and the high subband channels.

In the example of FIG. 4, fiber link segment 400 is bi-directional carrying traffic in two directions along the same fiber. In a long-distance fiber network, for example, these directions can be East and West between two cities. Thus, WDM 410 receives carriers for dense WDM channels traveling in one direction (i.e. West) and multiplexes them onto single mode fiber 415. On the other hand, WDM 410 receives carriers for dense WDM channels traveling in the other direction (i.e. East) and demultiplexes them from single mode fiber 415.

In general, any combination of the dense WDM channels in the 1310 nm can be allocated for carrying signals in one or both directions over fiber link 400. In one embodiment shown in FIG. 4, however, carriers traveling in one direction (West) are allocated channels in the low subband 140. Carriers traveling in the other direction (East) are allocated channels in the high subband 160. Fiber link 400 can also be modified to be two uni-directional links.

Figure 5:
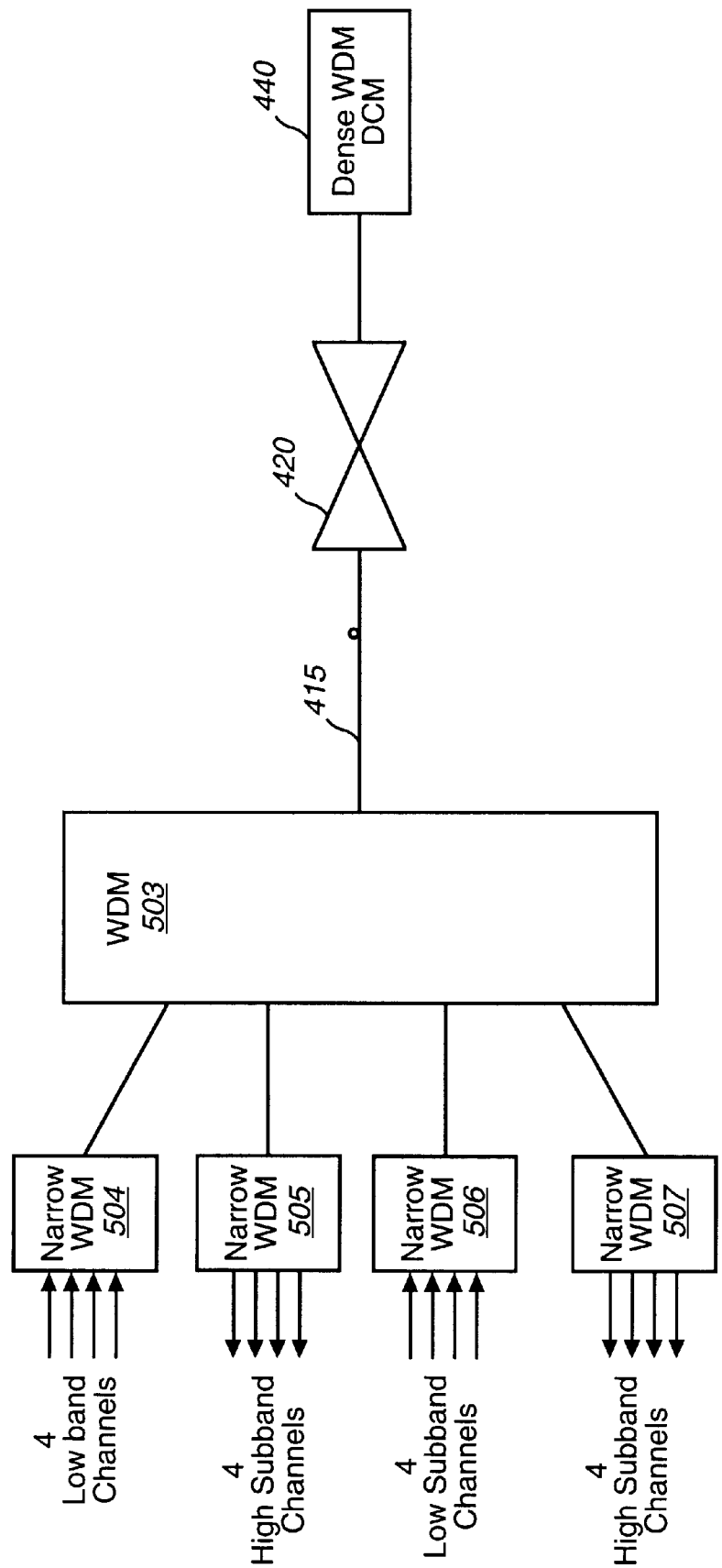
FIG. 5 is diagram of another example fiber link segment supporting WDM in the 1310 nm window according to the present invention.

FIG. 5 is diagram of another example of fiber link segment 400 supporting WDM in the 1310 nm window according to the present invention. In FIG. 5 WDM 410 is replaced by four narrow WDMs 504, 505, 506, and 507 and a WDM 503 which can be a narrow, coarse, or broadband WDM. In FIG. 5 to minimize the potential of crosstalk or other interference, four carriers in four respective low subband channels traveling in one direction (West) are received at WDM 504 for multiplexing and transmission to WDM 503. Four other carriers in four respective low subband channels traveling in one direction (West) are received at WDM 506 for multiplexing and transmission to WDM 503. WDM 503 then multiplexes the eight low subband channels for transmission over single mode fiber 415.

Considering the other direction (East), WDM 503 demultiplexes eight high subband channels received from single mode fiber 415 into two groups of four high subband channels. One group of four respective high subband channels traveling in one direction (East) are then received at WDM 505 for further demultiplexing and transmission to optical receivers. The other group of four carriers in four respective high subband channels traveling in one direction (East) are received at WDM 507 for demultiplexing and transmission to optical receivers.

For clarity, only one end of a fiber link segment 400 is shown in FIGS. 4 and 5; however, the operation of the other end is similar as would be readily apparent to a person skilled in the art given this description. Also, for clarity, only one low subchannel and one high subband channel is shown with respect to WDM 410. However, any number of channels in the low subband 140 and/or high subband 160 can be provided to WDM 410, as discussed above. Similarly, FIG. 5 shows 16 channels in groups of four for illustrative purposes. The present intention is not so limited, as any number of channels can be allocated between WDMs 504–507 in dense WDM within the 1310 nm window in the low subband 140 and/or high subband 160 as discussed above. Further to minimize cross-talk and interference even more, different groups of channels within low subband 140 can be allocated to travel in different directions (likewise, different groups of channels within high subband 160 can be allocated to travel in different directions).

Figure 6:
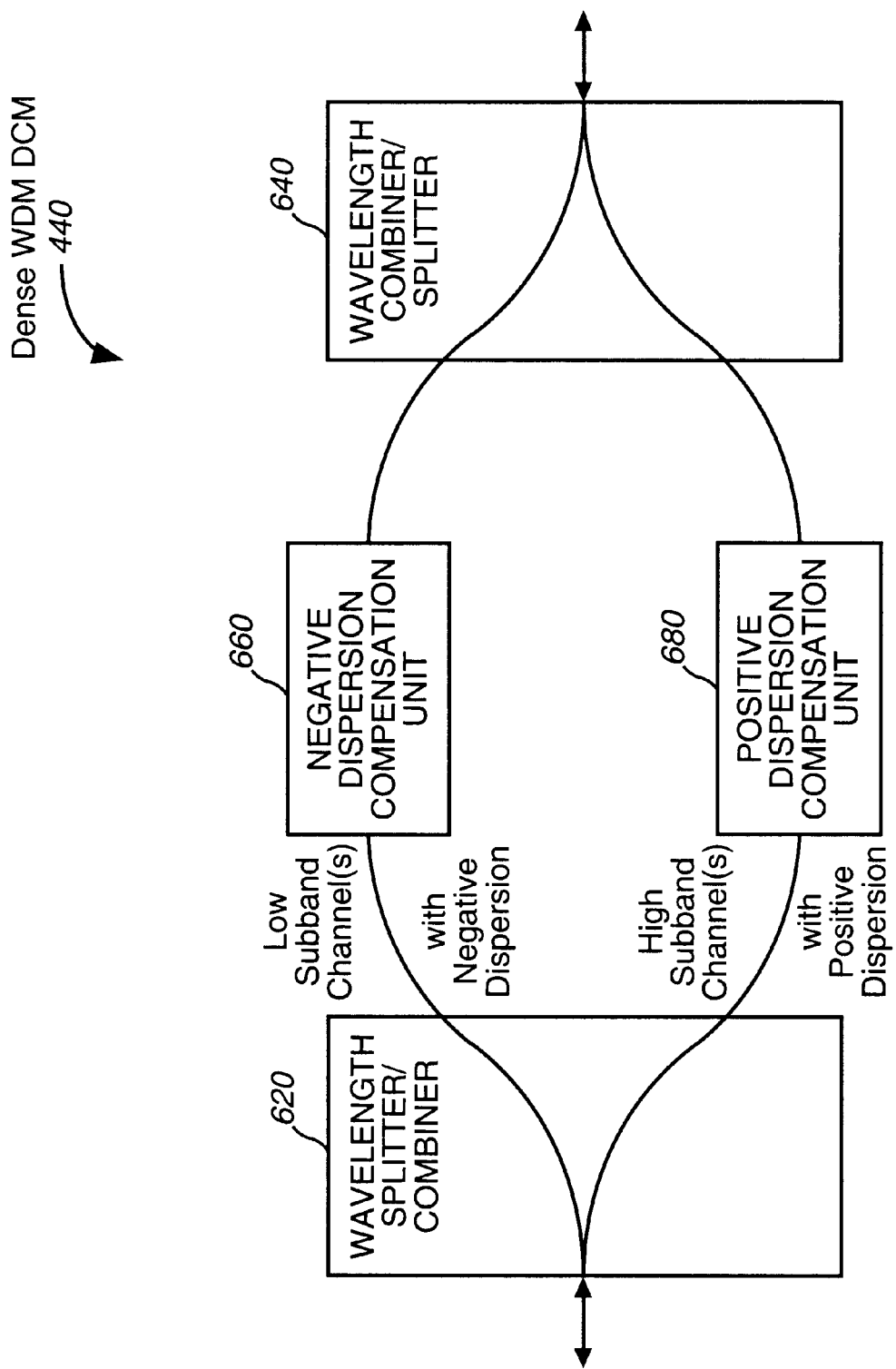
FIG. 6 is a diagram showing in more detail an example of the dense WDM dispersion compensation module of FIGS. 4 and 5.

FIG. 6 is a diagram showing in more detail an example dense WDM dispersion compensation module (DCM) 440 for use with NDSF fiber. Dense WDM DCM 440 includes two wavelength splitter/combiners 620 and 640. Negative dispersion compensation unit 660 (negative DCM 660) and positive dispersion compensation unit 680 (positive DCM 680) are provided in parallel between wavelength splitter/combiners 620 and 640. Dense WDM DCM 440 is especially important for dispersive fiber media and long distance fiber links.

As described earlier with respect to FIGS. 3A–3B, carriers in high subband 160 experience positive dispersion along NDSF and thus are passed by wavelength combiners/ splitters 620,640 to positive DCM 680. Positive DCM 680 compensates for the positive dispersion (in magnitude and/or slope) along NDSF. For example, positive DCM 680 can include one or more segments of conventional DSF, or the recently introduced LS fiber, because these are optimized for 1550 nm and can impart a substantial negative dispersion value at 1310 nm. Positive DCM 680 can also a chirped fiber Bragg grating to compensate for positive dispersion, as is well known in the art See, e.g., Agrawal, *"Fiber-Optic Communication Systems,"* Second Ed. (John Wiley & Sons: New York 1997), section 9.6.2., chapter 9, pp. 425–466 (incorporated herein by reference in its entirety).

Carriers in low subband 140 experience negative dispersion along NDSF, and thus are passed by wavelength combiners/splitters 620, 640 to negative DCM 660. Negative DCM 660 compensates for the negative dispersion along NDSF. For example, negative DCM 660 can be a chirped fiber Bragg grating set to compensate for negative dispersion, as is well known in the art.

In addition, as described above with respect to FIGS. 3A and 3C–3E, negative dispersion can occur in both the low subband 140 and the high subband 160 when single mode fiber 415 is a DSF fiber (DS, TRUEWAVE™ or LS). In this case, dense WDM DCM 440 need only include negative DCM 660. All channels in low subband 140 and high subband 160 are then compensated for the negative dispersion by negative DCM 660. In other words, carriers in the dense WDM channels in the low and high subbands pass through one or more chirped fiber Bragg gratings to compensate for the negative dispersion along DSF.

In addition, dense WDM DCM 440 according to the present invention can also compensate for the positive-slope dispersion imparted by single mode fiber. For example, chirped fiber Bragg grating(s) can be used to finely compensate for the slope of positive dispersion in each carrier signal transported over a single mode fiber (NDSF or DSF) in respective dense WDM channels in the low and high subbands. Such chirped fiber Bragg gratings can be coupled separately to dense DCM 440, or can be included in either or both of negative DCM 660 and positive DCM 680.

A high-speed fiber optic network or link using a dense WDM in the 1310 nm window according to the present invention can include, but is not limited to, an OC-48 or OC-192 bit rate. For an OC-48 bit rate of approximately 2.5 Gb/s, a fiber type (SMF-28, SMF-DS, SMF-LS, and TRUEWAVE™) can be used. For an OC-192 bit rate of approximately 10 Gb/s, an NDSF (SMF-28) fiber is preferred (though at such high bit rates channel spacing for a channel plan for low subband 140 and high subband 160 may have to be greater).

Example Distances

Figure 7:
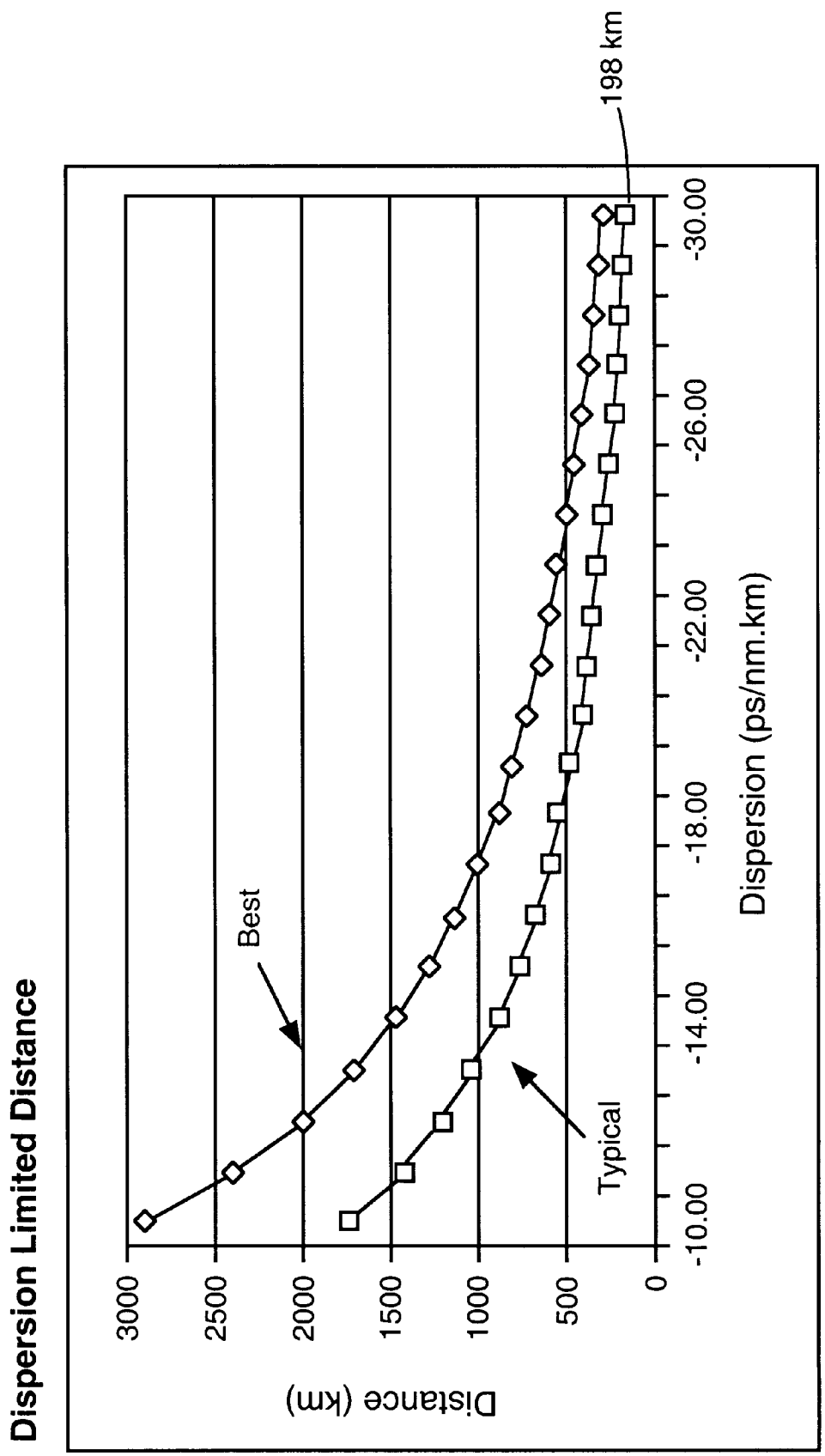
FIG. 7 is graph illustrating the dispersion limited distance in approximately typical and best cases of OC-48 optical communication carried over a NDSF single-mode fiber.

FIG. 7 is graph illustrating examples of the dispersion limited distance in typical and best cases of OC-48 optical communication carried over a DSF single-mode fiber. In the typical case, the distance an OC-48 carrier signal can travel is limited to about 1750 km for a low dispersion value of −10 ps/nm-km and to about 198 km for a higher dispersion value of −30 ps/nm-km. In a best case, the distance an OC-48 carrier signal can travel is limited to about 2900 km for a low dispersion value of −10 ps/nm-km and to about 300 km for a higher dispersion value of −30 ps/nm-km.

Figure 8:
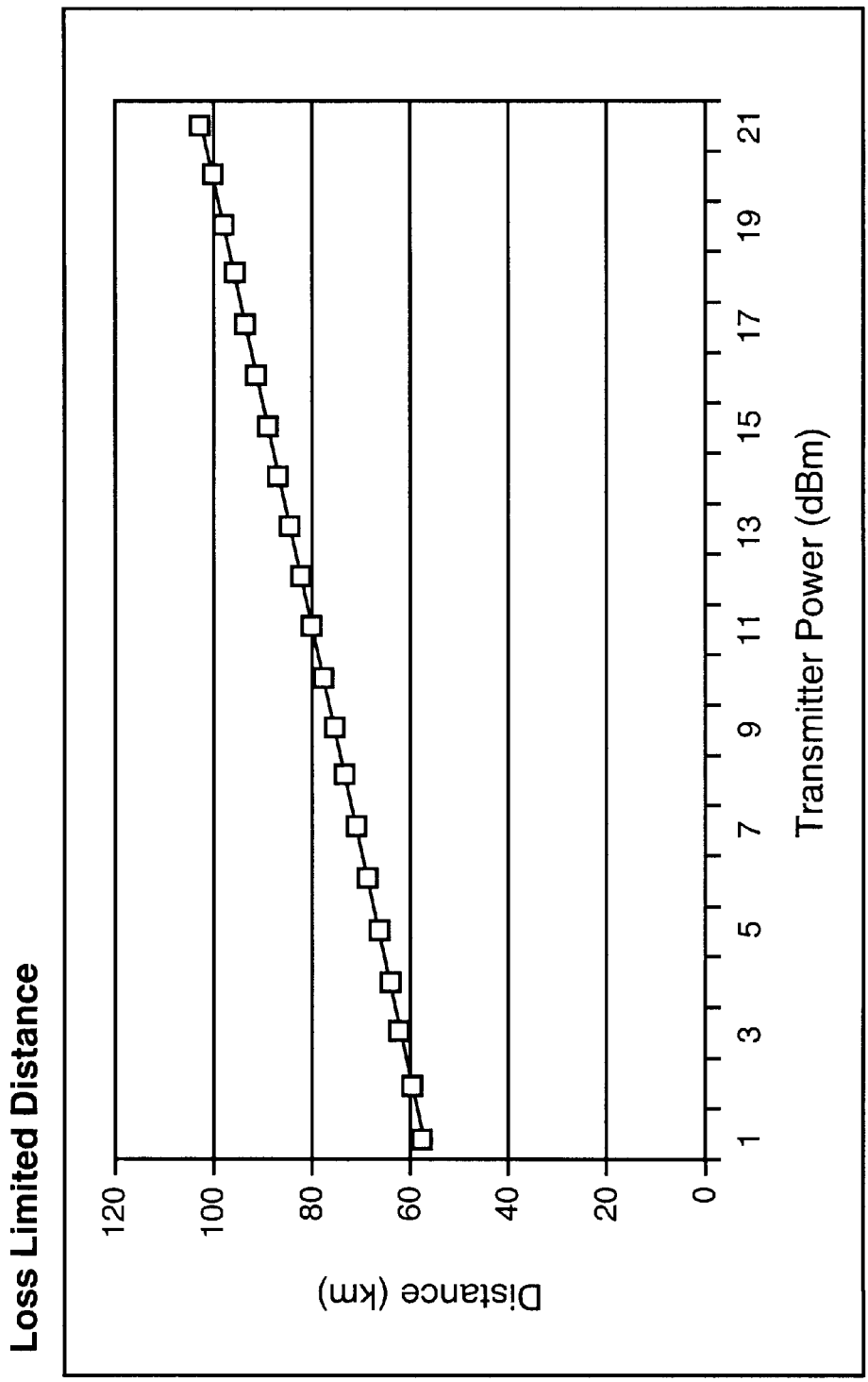
FIG. 8 is graph illustrating the loss limited distance in approximately typical and best cases of OC-48 and OC-192 optical communication carried over a NDSF single-mode fiber.

FIG. 8 is graph illustrating examples of the loss in transmitted power over distance. The distance an OC-48 carrier signal can travel and be satisfactorily detected can be limited by the transmitter power. As shown in FIG. 8, the distance varies between about 60 and 100 km for OC-48 signals transmitted by transmitters having a transmitter power between 1 and 21 dBm. The plot in FIG. 8 assumes a minimum receiver level during normal operation of about −26 dBm. As well known in the art, the unit "dBm" is a derived unit for expressing power and is defined as power (in dBm)=10 log$_{10}$[power/1 mW]. See, Agrawal, "Decibel Units", Appendix B, pp. 535–536 (incorporated herein by reference). The examples in FIGS. 7 and 8 are not intended to limit the scope of the present invention As one skilled in the art would appreciate given this description, different link and network designs and components (e.g higher transmitter powers, low dispersion fibers, frequent spacing of optical amplifiers or regenerators, and a different dispersion compensation module (DCM)) can be used to achieve long-distance fiber optic communication using dense WDM in the 1310 nm band according to the invention.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for providing dense wavelength division multiplexing during optical communication, comprising the steps of:

establishing, within a 1310 nm band, a guardband that includes the zero dispersion wavelength $\lambda_0$ of a single-mode fiber, said guardband separating a low subband and a high subband within the 1310 nm band;

transmitting a first signal over the single mode fiber, said first signal having a wavelength in said low subband; and transmitting a second signal over the single mode fiber, said second signal having a wavelength in said high subband.

2. A method for providing dense wavelength division multiplexing (dense WDM) during multi-channel optical communication, comprising the steps of:

establishing, within a 1310 nm band, a guardband that includes the zero dispersion wavelength $\lambda_0$ of a single-mode fiber, said guardband separating a low subband and a high subband within the 1310 nm band; and transporting a plurality of carrier signals in respective dense WDM channels over the single mode fiber, said carrier signals having wavelengths in at least one of said low subband and said high subband within the 1310 nm band.

3. The method of claim 2, wherein said establishing step comprises the step of establishing, within a 1310 nm band, a guardband that includes a zero dispersion wavelength $\lambda_0$ of a single-mode fiber, wherein the zero dispersion wavelength $\lambda_0$ is in a range between approximately 1309 nm to 1315 nm.

4. The method of claim 2, wherein said establishing step comprises the step of establishing, within a 1310 nm band, a guardband having a width that includes a zero dispersion wavelength $\lambda_0$ of a single-mode fiber, said guardband width being set such that the absolute value of dispersion values in both the high and low subbands is approximately equal to or greater than 0.5 ps/nm-km; whereby, four-wave mixing (FWM) is minimized.

5. The method of claim 2, wherein said establishing step comprises the step of establishing, within a 1310 nm band, a guardband having a width of at least two nm that includes a zero dispersion wavelength $\lambda_0$ of a single-mode fiber.

6. The method of claim 2, wherein said establishing step comprises the step of establishing, within a 1310 nm band, a guardband having a width of approximately 17 nm that includes a zero dispersion wavelength $\lambda_0$ of a single-mode fiber.

7. The method of claim 2, wherein said establishing step comprises the step of establishing, within a 1310 nm band, a guardband having a range between approximately 1300 nm and 1320 nm, said guardband separating a low subband having a range between approximately 1270 nm and 1300 nm and a high subband having a range between approximately 1320 nm and 1365 nm.

8. The method of claim 2, wherein said establishing step further comprises the step of separating said dense WDM channels within the low subband and the high subband by a channel spacing.

9. The method of claim 8, wherein said separating step comprises the step of separating said dense WDM channels within the low subband and the high subband by a channel spacing of at least approximately 100 GHz.

10. The method of claim 2, wherein said establishing step comprises the step of establishing, within a 1310 nm band, a guardband having a range between approximately 1300 nm and 1320 nm, said guardband separating a low subband having a range between approximately 1295 nm and 1300 nm and a high subband having a range between approximately 1320 nm and 1365 nm; and further comprises the step of separating approximately nine of said dense WDM channels within the low subband and approximately seventy-six of said dense WDM channels within the high subband by a channel spacing of at least approximately 100 GHz.

11. The method of claim 2, further comprising the step of compensating for at least one of negative dispersion and positive dispersion in the plurality of carrier signals transported over the single mode fiber in the respective dense WDM channels.

12. The method of claim 11, wherein the single mode fiber comprises non-dispersion shifted fiber, said transporting step transports a plurality of carrier signals in respective dense WDM channels over the non-dispersion shifted fiber, said carrier signals having wavelengths in said low subband and said high subband within the 1310 nm band, and said dispersion compensating step comprises the steps of:

compensating for positive dispersion in each carrier signal transported over the non-dispersion shifted fiber in the respective dense WDM channels in the high subband; and compensating for negative dispersion in each carrier signal transported over the non-dispersion shifted fiber in the respective dense WDM channels in the low subband.

13. The method of claim 11, wherein the single mode fiber comprises dispersion shifted fiber, said transporting step transports a plurality of carrier signals in respective dense WDM channels over the dispersion shifted fiber, said carrier signals having wavelengths in said low subband and said high subband within the 1310 nm band, and said dispersion compensating step comprises the steps of:

compensating for negative dispersion in each carrier signal transported over the dispersion shifted fiber in the respective dense WDM channels in the high subband; and compensating for negative dispersion in each carrier signal transported over the dispersion shifted fiber in the respective dense WDM channels in the low subband.

14. The method of claim 11, further comprising the step of multiplexing the plurality of carrier signals prior to said transporting step.

15. A multi-channel optical communication system comprising:
   a single mode fiber having a zero dispersion wavelength $\lambda_o$; and
   a plurality of carrier signals traveling through said single mode fiber, said carrier signals having wavelengths in at least one of a low subband and a high subband within a 1310 nm band, said low subband and high subband being separated by a guardband that includes the zero dispersion wavelength $\lambda_0$ of said single mode fiber.

16. The system of claim 15, wherein said zero dispersion wavelength $\lambda_0$ is in a range between approximately 1309 nm to 1315 nm.

17. The system of claim 15, wherein said guardband has a width that includes a zero dispersion wavelength $\lambda_0$ of a single-mode fiber, said guardband width being set such that the absolute value of dispersion values in both the high and low subbands is approximately equal to or greater than 0.5 ps/nm-km; whereby, four-wave mixing (FWM) is minimized.

18. The system of claim 15, wherein said guardband has a width of at least two nm.

19. The system of claim 15, wherein said guardband has a width of approximately 17 nm.

20. The system of claim 15, wherein said guardband has a range between approximately 1300 nm and 1320 nm, said low subband has a range between approximately 1270 nm and 1300 nm, and said high subband has a range between approximately 1320 and 1365 nm.

21. The system of claim 15, wherein said plurality of carrier signals transport data in respective dense WDM channels within said low subband and said high subband, said dense WDM channels being separated by a channel spacing.

22. The system of claim 21, wherein said channel spacing is at least approximately 100 GHz.

23. The system of claim 15, wherein:
   said guardband has a range between approximately 1300 nm and 1320 ;
   said low subband has a range between approximately 1295 mm and 1300 nm;
   said high subband has a range between approximately 1320 and 1365 nm; and
   said plurality of carrier signals are transported in any one of approximately nine dense WDM channels within the low subband and approximately seventy-six dense WDM channels within the high subband, each of said dense WDM channels within the low subband having a channel spacing of at least approximately 100 GHz and each of said dense WDM channels within the high subband having a channel spacing of at least approximately 100 GHz.

24. The system of claim 15, further comprising:
   a dense WDM dispersion compensation unit that compensates for at least one of negative dispersion and positive dispersion in said plurality of carrier signals transported over said single mode fiber in respective dense WDM channels.

25. The system of claim 24, wherein said single mode fiber comprises non-dispersion shifted fiber, and said dense WDM dispersion compensation unit comprises:
   a positive dispersion compensation unit that compensates for positive dispersion in each carrier signal transported over said non-dispersion shifted fiber in the respective dense WDM channels in said high subband; and
   a negative dispersion compensation unit that compensates for negative dispersion in each carrier signal transported over said non-dispersion shifted fiber in the respective dense WDM channels in said low subband.

26. The system of claim 25, wherein:
   said positive dispersion compensation unit comprises at least one of a dispersion shifted fiber segment and a chirped fiber Bragg grating to compensate for the magnitude of positive dispersion in each carrier signal transported over said non-dispersion shifted fiber in the respective dense WDM channels in said high subband; and
   said negative dispersion compensation unit comprises a chirped fiber Bragg grating to compensate for the magnitude of negative dispersion in each carrier signal transported over said non-dispersion shifted fiber in the respective dense WDM channels in said low subband.

27. The system of claim 24, wherein said single mode fiber comprises dispersion shifted fiber, and said dense WDM dispersion compensation unit comprises a negative dispersion compensation unit that compensates for negative dispersion in each carrier signal transported over said dispersion shifted fiber in the respective dense WDM channels in said high subband and in said low subband.

28. The system of claim 27, wherein:
   said negative dispersion compensation unit comprises a chirped fiber Bragg grating to compensate for the magnitude of negative dispersion in each carrier signal transported over said dispersion shifted fiber in the respective dense WDM channels in said high subband and in said low subband.

29. The system of claim 15, further comprising a wavelength division multiplexing unit optically coupled to said single mode fiber, wherein, said wavelength division multiplexing unit multiplexes individual carrier signals and outputs said plurality of carrier signals to said single mode fiber.

30. The system of claim 29, wherein said wavelength division multiplexing unit comprises at least one narrow band WDM unit.

31. The system of claim 29, wherein said wavelength division multiplexing unit multiplexes a first group of individual carrier signals traveling in one direction and outputs said first group of multiplexed carrier signals to said single mode fiber and demultiplexes a second group of individual carrier signals traveling in another direction and outputs said second group of demultiplexed carrier signals.

32. A method for providing multi-channel optical communication, comprising the steps of:
   establishing, within a 1310 nm band, a guardband that separates a low subband and a high subband within the 1310 nm band; and
   transporting a plurality of carrier signals over a fiber, said carrier signals having wavelengths in at least one of said low subband and said high subband within the 1310 nm band.

* * * * *